Aug. 26, 1930.  V. J. BURNELLI  1,774,473
AIRPLANE EMPENNAGE CONSTRUCTION
Filed Feb. 4, 1929  2 Sheets-Sheet 1
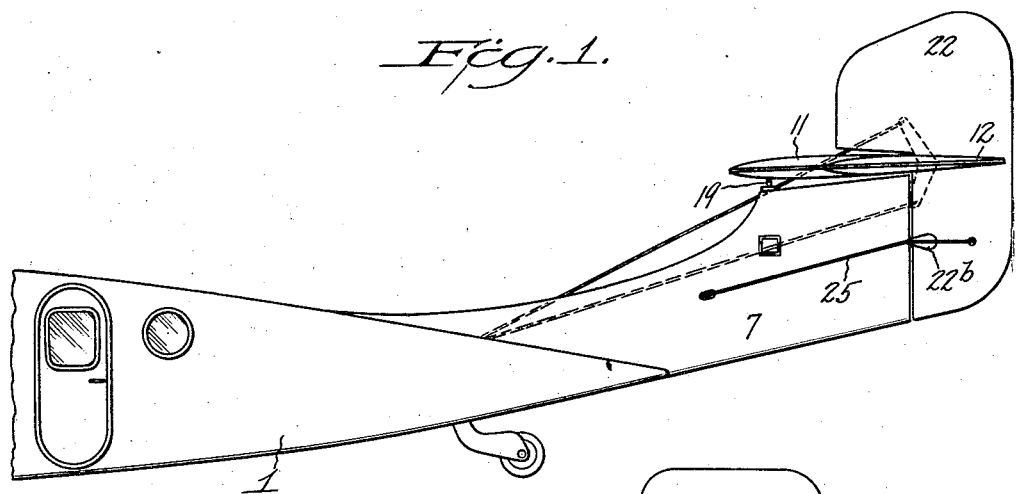
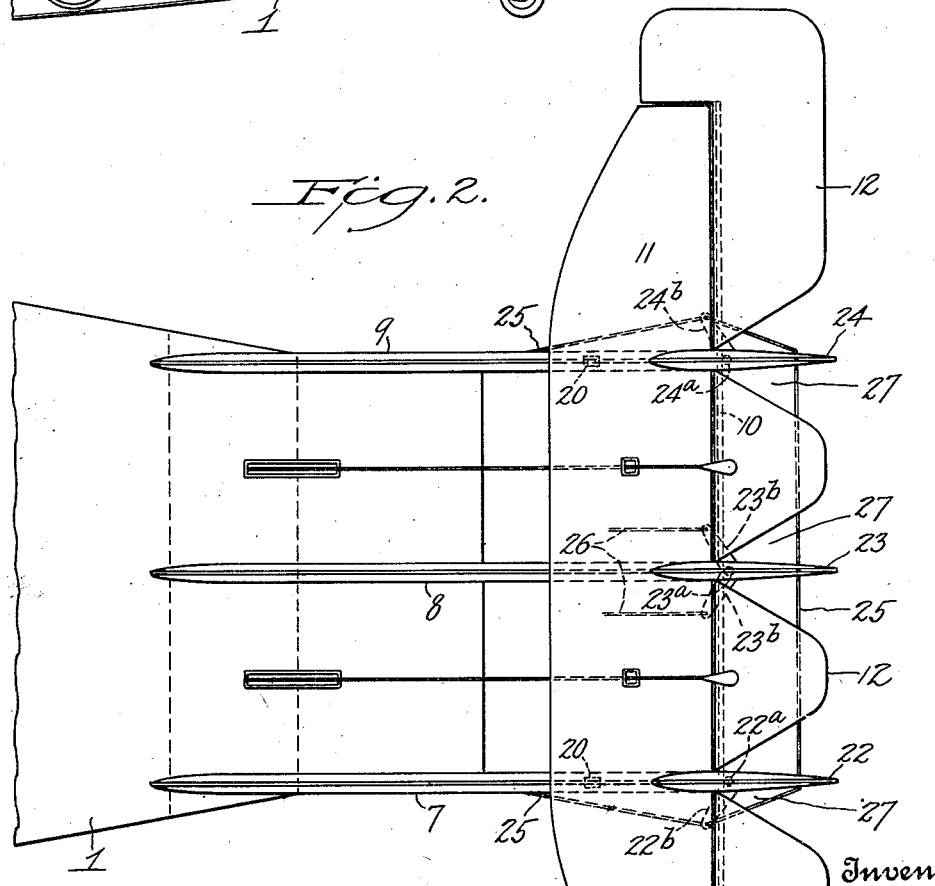

Aug. 26, 1930.  V. J. BURNELLI  1,774,473
AIRPLANE EMPENNAGE CONSTRUCTION
Filed Feb. 4, 1929   2 Sheets-Sheet 2
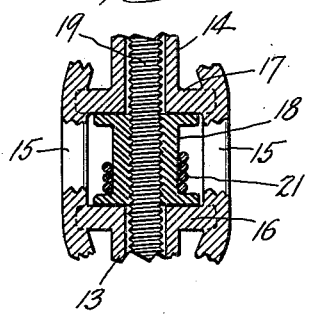
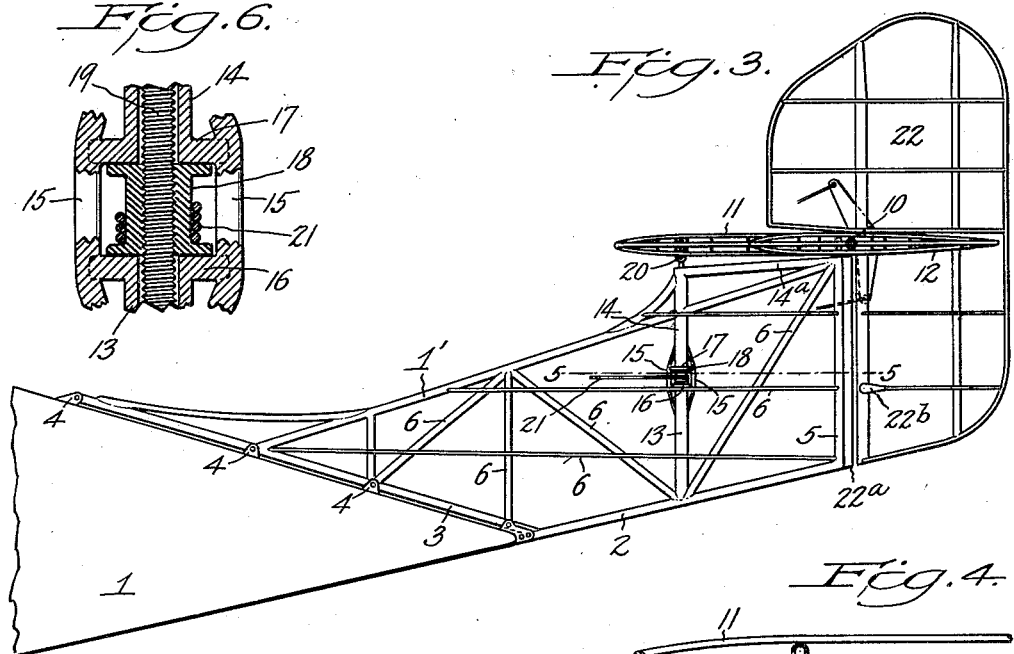
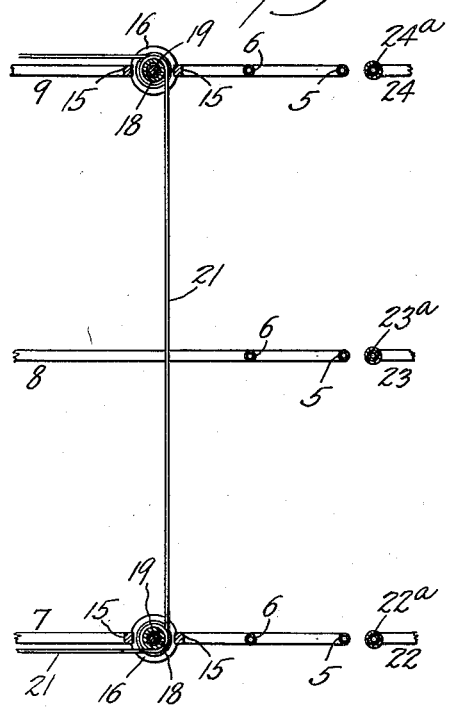
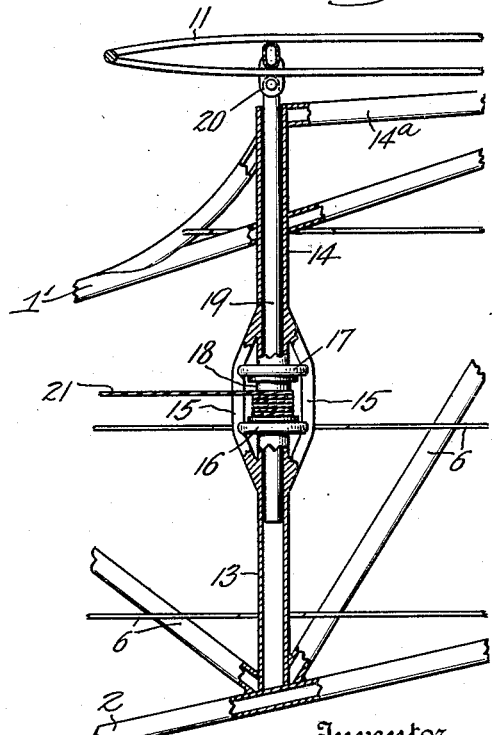

Patented Aug. 26, 1930

1,774,473

UNITED STATES PATENT OFFICE

VINCENT J. BURNELLI, OF NEW YORK, N. Y., ASSIGNOR TO THE UPPERCU-BURNELLI CORPORATION, A CORPORATION OF DELAWARE

AIRPLANE-EMPENNAGE CONSTRUCTION

Application filed February 4, 1929. Serial No. 337,200.

This invention relates to airplanes and my improvements are directed in particular to a tail group or empennage adapted for service with an airplane of large size. Especially my invention is intended for use with an airplane of the Burnelli type wherein the fuselage is of airfoil contour throughout and the frame structure which supports the empennage is carried by and extended from said fuselage.

With an airplane of the size and character indicated it is desirable that the horizontal stabilizer, which is of proportionate area, be provided with control means, operable by the pilot, of suitable nature for its manipulation.

Therefore one feature of my invention comprises the provision of two vertical shafts pivotally engaging the stabilizer at separated points thereof and screw threaded means for raising and lowering said shafts together with a minimum effort on the part of the operator, to thereby control the movement of the stabilizer with facility and accuracy.

Also my invention includes the feature of three vertical rudders, whereof the two outer rudders are operable together for lateral control purposes, and the middle rudder is independently operable and is adapted to be set at an angle for the purpose of maintaining the airplane on a given course against a tendency to drift.

Still further my invention comprehends the provision of a trussed frame attached to and extended rearwardly from the rear portion of an airfoil-fuselage, said frame serving as the support for the members of the tail group.

Other features and advantages of my invention will hereinafter appear.

In the drawings:—

Figure 1 is a side elevation showing an airplane empennage carried by vertical fins that are connected to and extended from the rear portion of a fuselage that is of airfoil contour.

Fig. 2 is a top plan view thereof.

Fig. 3 is a similar view to that of Fig. 1, enlarged, but without the covering for the fins and members of the tail group.

Fig. 4 is an enlarged detail showing part of the mechanism for operating the horizontal stabilizer.

Fig. 5 is a section on the line 5—5 of Fig. 3, and

Fig. 6 is an enlarged detail of one of the threaded spools and the screw shaft which is given vertical movement thereby.

In said figures let 1 indicate the fuselage of an airplane, which fuselage may have airfoil contour throughout its length as established in the Burnelli type of airplane.

Extended rearwardly and upwardly from the trailing edge portion of the fuselage is a series of trussed structures (see Fig. 3) each composed of the longitudinal tubular members 1', 2, in vertically spaced relation, said members being connected at their forward ends by a tubular member 3 that lies upon the upper surface of said trailing edge portion and is secured thereto as at 4.

Also the rear ends of members 1, 2 are connected by a vertical, tubular member 5, while truss bracing members 6 are arranged in connective relation in the frame composed of members 1, 2, 3, 5.

In Figs. 1 and 2 these trussed frame structures are shown as provided with covering material and are there represented as vertical stabilizing fins 7, 8 and 9, disposed in equi-spaced relation. The intermediate fin 8 has been introduced by me for the purpose of increasing the structural strength of the fin group in view of the relatively large size of the tail group members which are carried thereby.

Carried by the trussed frames of the fins 7, 8, 9, at the upper rear ends thereof, is a horizontal shaft 10 which serves as the pivotal support both for the horizontal stabilizer 11 and for the elevator 12.

As means for operating stabilizer 11 each of the fins 7, 9 includes in its trussed frame structure a hollow post composed of lower section 13 and upper section 14, these sections being spaced apart and united by webs 15, to thereby render the hollow post continuously integral. The opposed ends of post sections 13, 14 are provided with flanges 16, 17 which respectively serve as bearing surfaces for a hollow revoluble spool 18, whose inner surface is threaded, to engage a screw rod 19 that lies within both sections 13, 14. The upper end of rod 19 pivotally engages a lug 20 that depends from stabilizer 11, forwardly of shaft 10, whereby vertical motion of rod 19 will have the effect of varying the angle of incidence of said stabilizer 11.

Wrapped upon and extended between the spools 18 of the hollow posts 13, 14 carried by both the fins 7, 9 is a cable 21, whose respective ends are continued to suitable control means (not shown) for operation by the pilot. It will be seen that upon turning the spools in one direction the rod 19 will be raised, lowering thereof occurring when the spools are turned in the opposite direction.

By reason of the two point, unified application of power to the stabilizer, at spanwise separated positions thereon, it is the more readily subject to control. It will be noted that a reinforcing member 14$^a$ extends from the top of section 14 to the rear member 5 of the frame structure.

There are three vertical rudders, respectively denoted by the numerals 22, 23, 24, which are mounted on the rudder posts 22$^a$, 23$^a$, 24$^a$ that are respectively carried by the rear members 5 of the trussed frames for fins 7, 8, 9. The two outer rudders, 22, 24, with operating horns 22$^b$, 24$^b$, have a connecting cable 25 that leads to the usual foot control (not shown), but the middle rudder, 23, having operating horns 23$^b$, is provided with a cable 26 that leads to special hand control means (not shown) whereby said rudder 23 may be set in desired fixed angles by the pilot, for enabling the airplane to maintain a given course against drifting influences.

Clearances 27 are provided in the elevator 12 to permit the operation of rudders 22, 23, 24.

Variations within the spirit and scope of my invention are equally comprehended by the foregoing disclosure.

I claim:—

1. The combination with an airplane having a fuselage of airfoil contour, of a vertical fin comprising a trussed frame, said frame engaging the upper rearward surface of said airfoil-fuselage and extending rearwardly therebeyond and upwardly therefrom, and a tail group carried by said frame.

2. The combination with an airplane having a fuselage of airfoil contour and a horizontal stabilizer, of a pair of vertical fins extended rearwardly from said airfoil-fuselage and supporting said stabilizer, a hollow vertical post, in two sections, included in each fin, a screw rod movable vertically in each post and engaging said stabilizer, an internally threaded spool engaging said rod and localized between the post sections and a controlling cable wrapped about both said spools.

3. The combination with an airplane having a fuselage of airfoil contour of three spaced vertical fins extended rearwardly from said airfoil-fuselage, a tail group including a horizontal stabilizer, carried by said fins, the two outer fins also carrying means for operating said stabilizer, and the middle fin being provided to increase the supporting strength of the fin group.

4. The combination with an airplane having a fuselage of airfoil contour, of three vertical rudders, in spaced relation, extended from said airfoil-fuselage, the two outer rudders having control means for their operation in unison, and the middle rudder being operable independently.

5. The combination with an airplane having a fuselage of airfoil contour, of three vertical fins in spaced parallelism, extended rearwardly from said airfoil fuselage, and three vertical rudders mounted respectively on said fins, the two outer rudders having control means for their operation in unison, and the middle rudder being operable independently.

6. The combination with an airplane having a fuselage of airfoil contour, of three vertical fins, each comprising a trussed frame, said frames engaging the upper rearward surface of said airfoil-fuselage and extending rearwardly therebeyond and upwardly therefrom, and a tail group carried by said frames.

Executed this 30th day of January, 1929.

VINCENT J. BURNELLI.